Jan. 10, 1928.
A. B. NIXON
HARROW
Filed Jan. 10, 1927
1,656,126
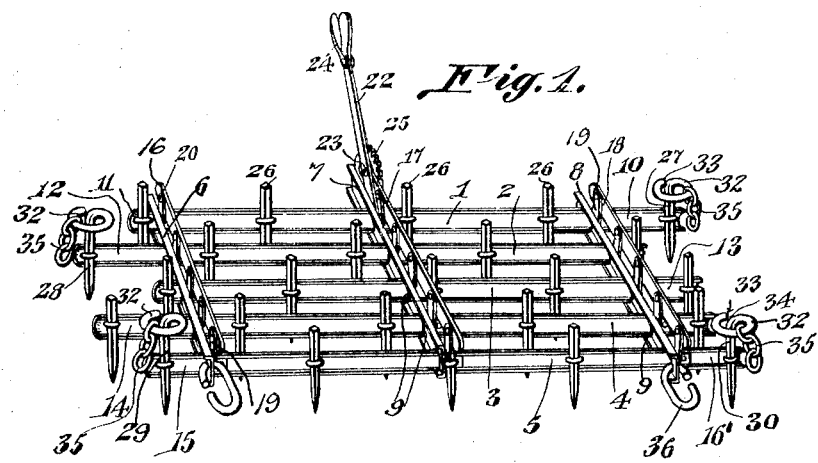
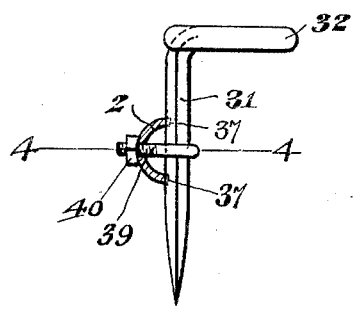
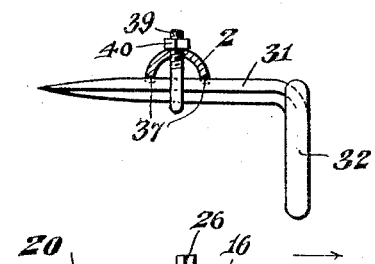
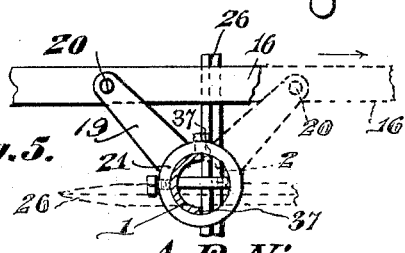
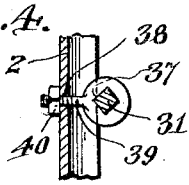
A. B. Nixon, INVENTOR.
BY
Geo. P. Kimmel, ATTORNEY.

Patented Jan. 10, 1928.

1,656,126

UNITED STATES PATENT OFFICE.

ALBERTUS B. NIXON, OF SAC CITY, IOWA.

HARROW.

Application filed January 10, 1927. Serial No. 160,233.

This invention relates to harrows of that type including teeth carrying bars or beams capable of being rocked or shifted from active to inactive position, but more particularly to the end tooth or teeth carried by certain of the teeth-carrying bars or beams, and the invention has for its object to provide, in a manner as hereinafter set forth, an end or what may be termed a side tooth having its head disposed at right angles to its shank and constructed in a manner to form a supporting runner or skid disposed at right angles to the harrowing position of the harrow when the teeth carrying bars or beams are shifted from active to inactive position.

The design and purpose being to enable a harrow of two or more sections to be easily and quickly connected together for the purpose of conveniently moving the harrow endwise through gates, across bridges or down a road or lane without disconnecting the sections from the drawbar or loading the same on any vehicle and without impairing the harrow in any manner.

Further objects of the invention are to provide, in a manner as hereinafter set forth, an end or side harrow tooth for the purpose referred to and which is simple in its construction and arrangement, strong, durable, thoroughly efficient in its use, readily installed, compact, providing a hitch, or rather means to permit of quickly attaching a hitch with the harrow body and comparatively inexpensive to manufacture.

This invention may be used upon any construction of harrow which is so designed as to permit the teeth carrying bars or beams to be shifted from an active position to an inactive position so that the teeth can be placed in a horizontal position for moving to and from the field.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation of a harrow constructed in accordance with this invention.

Figure 2 is an elevation of an end or side tooth constructed in accordance with this invention and in active position and further illustrated as secured to its associated carrying bar or beam.

Figure 3 is a view similar to Figure 4 illustrating a tooth shifted from active position to provide a supporting runner or skid for the harrow body.

Figure 4 is a section on line 4—4 Figure 2.

Figure 5 is a fragmentary view illustrating one of the link connections between a teeth-carrying bar or beam and the rocking means therefor.

Referring to the drawings in detail the harrow illustrated thereby is shown by way of example as including five teeth-carrying bars or beams, but it is to be understood that the number can be increased or decreased if desired. The teeth-carrying bars or beams are indicated at 1, 2, 3, 4 and 5, each of which is half round in cross section. The bars are disposed in parallelism, but spaced from each other. The bars are mounted in supports which are disposed in a transverse direction with respect to the direction in which the bars extend. As shown three supports are provided for the bars and said supports are indicated at 6, 7 and 8 and are arranged equi-distant with respect to each other. Preferably each support is in the form of a channel iron. Each support is formed with a lengthwise extending row of spaced circular openings 9 for the passage of the bars and the openings 9 in one support are arranged in alinement with the openings 9 in the adjacent support. The bar 1 extends from the outer supports 6, 8, but one end of the bar 1, which is indicated at 10 projects a greater distance from the support 8 than that end of the bar 1, which is indicated at 11, projects from the support 6. The bar 2 extends a greater distance from the support 6 than it does from the support 8 and the end of the bar 2 which projects from the support 6 is indicated at 12. The bar 3 projects at one end a greater distance from the support 8 than it does from the bar 6 and that end of the bar 3 which projects from the support 8 is indicated at 13. The bar 4 projects a greater distance from the support 6, than it does from the support 8 and the end of the bar 4 which projects from the support 6 is indicated at 14. The ends of the bar 5, which are indicated at 15 and 16' project the same distance from the supports 6 and 8. Preferably the bar 4 is of greater length than any of the other bars so that the end 14 thereof will extend the same distance from the support 6 as the end 12 of the bar 2. The bars can be rocked within the supports and the purpose thereof will be presently referred to.

The bars 1 to 5 inclusive are connected together by a set of shifting members, three in number, which are indicated at 16, 17 and 18 and which slide over the bars. The shifting member 16 is arranged in proximity to one side of the support 6. The shifting member 17 is positioned in proximity to one side of the support 7, and the shifting member 18 is positioned in proximity to one side of the support 8. The members extend above the supports and each member is connected to the series of bars by a set of links 19, pivotally connected at their upper ends as at 20 to a shifting member and having their lower ends provided with collars 21, which are mounted on and secured to the bars. An actuating lever 22, is pivotally connected as at 23 to the shifting member 17 and also pivotally connected to the support 7. The lever 22 includes a pawl and lever mechanism which associates with a rack 25, the latter being fixedly secured to the support 7, which projects a substantial distance from the bar 1 for the purpose of supporting the rack 25. The actuating lever 22 is provided for shifting the bars from active to inactive position. The active position is such whereby the bars will support the teeth in harrowing position, and inactive position is such that the teeth will be shifted to a horizontal position for the purpose of clearing the soil or roadway. The position of the bars and teeth when in active position is as illustrated in Figure 2 and when in inactive position is as illustrated in Figure 3. The shifting members 16, 17 and 18 provide for the synchronous rocking of the bars, due to the link connections between the shifting members and the bars.

Each bar is provided with a series of harrow teeth arranged in spaced relation, and indicated at 26 and each of said teeth is not provided with a head, but only constructed of a shank formed with a pointed end. Each shank is of polygonal cross section. The bar 1 at one end is provided with a headed tooth 27 which is arranged in the end 10 of the bar 1. The end 12 of the bar 2 is provided with a headed tooth 28. The ends 15 and 16' of the bar 5 are provided with headed teeth 29, 30 respectively. As the construction of each of the headed teeth is alike, but one will be described as the description of one will apply to the other. The headed tooth is formed of a shank 31 of polygonal cross section and a circular slitted head 32, of skeleton form, and which is disposed at right angles with respect to the upper end of the shank 31 and the shank 31 is disposed centrally with respect to one side of the head. The shank 31 terminates at its upper end in the head 32 and the free end 33 of the head is spaced from the point of joinder of the shank with what may be termed the inner end of the head. The spaced end 33 provides a clearance 34 so that a hitch 35 can be connected to the head 32.

When the bars 1 to 5, are shifted from active position, the heads 32 assume the position shown in Figure 3, and provide supporting runners or skids for the harrow. When the bars 1 to 5 are shifted from active position, all the teeth are then disposed in a horizontal position, but the teeth 26 do not act as supporting runners or skids.

The supports 6 and 8 are provided with oval-shaped split links 36, employed for attaching a coupling bar to a pair of harrows when it is desired to operate with a pair of harrows arranged in tandem position. The coupling bar would be provided with eyes for the reception of the links 36. Each of the bars 1 to 5, are provided with notches 37 forming seats for the shanks 31 and each of said bars is furthermore provided with openings 38 for the passage of eye-bolts 39 through which extend the shanks 31. The openings in the eye-bolts correspond in contour to the shape of the shanks 31. Clamping nuts 40 are mounted on the shanks of the eye-bolts 39 and abut against the bars 1 to 5. The manner of connecting a tooth to a bar is illustrated in Figure 4.

It is thought the many advantages of a harrow, constructed in accordance with this invention, can be readily understood, and although the preferred embodiment of the invention is as illustrated and described, yet it is to be understood that changes in the details of construction can be had which will fall within the scope of the invention as claimed.

What I claim is:—

1. In a harrow, sets of teeth, shiftable carriers therefor for supporting the teeth in and for moving them from harrowing position certain of said teeth including heads providing supporting means for the harrow extending at right angles to the harrowing position of the harrow when such teeth are moved from harrowing position, and further providing hitch coupling means for the harrow.

2. In a harrow a shiftable ground working tool provided at its upper end with a supporting runner for the harrow extending at right angles to the ground working position of the harrow when the tool is arranged out of ground working position, said supporting runner consisting of a circular head of skeleton form disposed at right angles with respect to the remaining portion of the tool and constructed to provide for the entrance and attaching of a hitch thereto.

3. In a harrow a combined ground working implement and supporting runner consisting of a shank having one end pointed and its other end terminating in a split circular head of skeleton form disposed at right angles with respect to the shank and having one end joined with the shank and its other end spaced from the point of joinder of the shank with the first mentioned end of the head.

4. A harrow tooth comprising a shank terminating at one end in a split skeleton head disposed at right angles throughout with respect thereto.

5. In a harrow, teeth movable from and to harrowing position, a series of opposed combined shiftable and supporting bars therefor, the teeth at the ends of the outer bars of said series each provided with a split skeleton head disposed at right angles with respect to the remaining portion thereof and providing runners for the harrow when such teeth are moved from harrowing position, and coupling means for an adjacent harrow carried by each head.

6. In a harrow, a tooth movable from and to harrowing position and including a shank terminating at one end into a right angularly disposed head providing when the tooth is moved from harrowing position a runner for the harrow disposed at right angles to the working position of the harrow, and coupling means carried by said head for an adjacent harrow.

In testimony whereof, I affix my signature hereto.

ALBERTUS B. NIXON.